July 2, 1974

I. MOKED 3,822,177

THERMOPLASTIC PELLETS AND METHOD OF PRODUCING
SHAPED ARTICLES THEREFROM
Filed June 1, 1971

Compacted Pellet

INVENTOR
*Isaac Moked*

BY

ATTORNEY

United States Patent Office 3,822,177
Patented July 2, 1974

3,822,177
THERMOPLASTIC PELLETS AND METHOD OF PRODUCING SHAPED ARTICLES THEREFROM
Isaac Moked, New Brunswick, N.J., assignor to Union Carbide Corporation, New York, N.Y.
Filed June 1, 1971, Ser. No. 148,685
Int. Cl. B32b 5/16
U.S. Cl. 161—170                                 13 Claims

ABSTRACT OF THE DISCLOSURE

The disclosure of this application is directed to thermoplastic pellets, cold compacted from thermoplastic particles having a maximum Standard Geometric Deviation of about 2.5 and having a particle size distribution of: substantially all particles smaller than about 10 mesh and at least about 30 percent (cumulative weight basis) of the particles smaller than about 30 mesh, which are characterized by excellent compression strength and are excellently suited for use in molding applications to produce thermoplastic articles of desired configuration.

---

Figure 1:
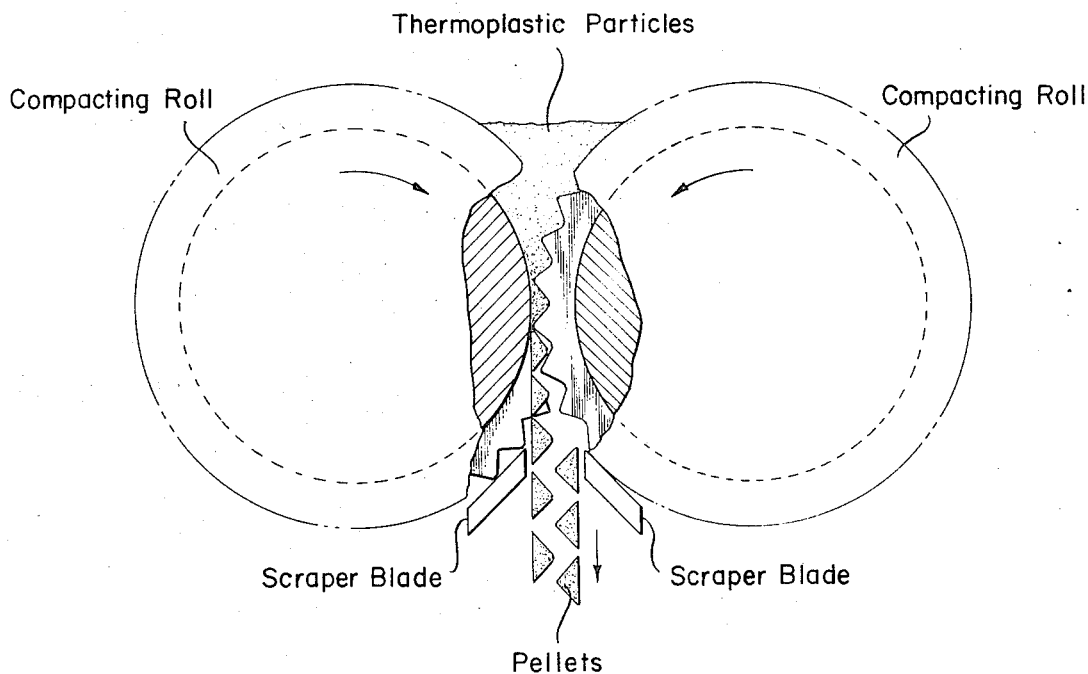

This invention relates to cold compacted, thermoplastic pellets. More particularly, this invention relates to thermoplastic particles, having a specified particle size distribution and Standard Geometric Deviation, which can be admixed, at ambient temperatures, with additives such as reinforcing agents, illustrative of which are glass fibers and the like and cold compacted into pellets having excellent compression strength and the pellets used in molding applications such as injection molding, compression molding and the like to produce thermoplastic articles characterized by excellent physical properties such as excellent flexural strength, flexural modulus, Izod impact strength and heat deflection characteristics.

Conventionally, thermoplastic polymers are admixed with reinforcing agents such as glass fibers, the resultant compositions pelletized and the pelletized compositions shipped to the ultimate molder wherein the pelletized compositions are molded into reinforced thermoplastic articles such as automotive parts, including automobile fenders and the like and in general, parts for consumer appliances. Admixing and pelletizing of thermoplastic polymers and glass fibers has been accomplished, in the past, by a multistage operation involving elevated temperatures. That is, the desired thermoplastic polymer is fed from a feed or supply hopper to a scale wherein it is weighed and combined with glass fibers which are also fed to the scale. From the scale, the weighed materials are fed into a hot compounder or extruder wherein they are "hot mixed," that is, admixed at elevated temperatures. The "hot" mix is then fed to a pelleter, emerging therefrom in the form of pellets.

"Hot" mixing and pelleting of thermoplastic compositions, as deescribed, has proved to be undesirable, in many instances, due to the tendency of the thermoplastic polymers to thermally degrade at the relatively high temperatures normally employed during the multi-stage mixing operation described. As a consequence, it has been found necessary to carefully control the temperatures to which the thermoplastic compositions are subjected to and to operate at lower and less efficient temperatures.

A careful control of the operating temperatures to the extent necessary for elimination of undesirable thermal degradation has resulted in an undesirable increase in the overall cost, time and expense, of the operation. Also, operating at "lower" temperatures, undesirably increases the power consumption necessary to operate the compounder or extruder. Furthermore, operating at "lower" temperatures has resulted, in many instances, in compositions in which the components are not thoroughly admixed. Consequently, articles produced from these compositions are characterized by poor physical properties.

Furthermore, while in the pelleter, the hot processed pellets are subjected to underwater cooling in order that the "hot" pellets not stick together. As a result, the water must be removed from the pellets in a subsequent operation, adding to the cost and complexity of the pelleting operation.

The present invention provides thermoplastic pellets which are produced at ambient temperatures, thus eliminating the disadvantages of operating at elevated temperatures, as previously described. The thermoplastic pellets of this invention, produced by cold compacting thermoplastic particles, per se, or in admixture with additives such as glass fibers, are excellently suited for use in molding applications to form thermoplastic articles of desired configuration, characterized by excellent physical properties. In addition, the thermoplastic pellets of this invention have excellent compression characteristics and consequently can withstand rough handling, as for example, is encountered during shipment of the material to the molder, without breaking down into undesirable, dusty fines.

Also, since the present invention is carried out at ambient temperatures, it is now possible to admix blowing agents with the thermoplastic particles and to cold compact the resultant compositions into pellets containing blowing agents. Pellets containing blowing agents, can be used to extrude cellular compositions about electrical conductors in accordance with the method described in U.S. Pat. 3,068,532 to William T. Higgins; granted Dec. 18, 1962.

Thermoplastic particles, which are compacted into pellets in accordance with this invention, have a maximum Standard Geometric Deviation of about 2.5 and a particle size distribution of:

1—Substantially all particles smaller than about 10 mesh (10 mesh U.S. Standard Screen).
2—At least about 30 percent, on a cumulative weight basis, of the particles smaller than about 30 mesh (30 mesh U.S. Standard Screen).

Figure 2:
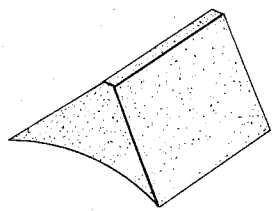

Particularly desirable pellets are prismatic in shape, as shown in FIG. 2 of the accompanying drawing, conveniently produced by a cold compacting operation using a rotary compactor, also as shown by a schematic view in FIG. 1. Ultimate size and configuration of the pellets will depend primarily upon the desires of the ultimate user.

Standard Geometric Deviation values noted in this application were determined as described in the article *Particle Size Analysis and Analyzers* by C. E. Lapple appearing in the May 20th, 1968 issue of Chemical Engineering.

Suitable thermoplastic polymers for purposes of this invention, include among others, homopolymers and copolymers of α-olefins. Exemplary of α-olefins are compounds having the formula:

$$CH_2=CHR$$

wherein R is hydrogen or a monovalent hydrocarbon radical, generally having a maximum of 8 carbon atoms and preferably having a maximum of 4 carbon atoms.

Specific α-olefins, include among others, ethylene, propylene, 1-butene and the like.

Particularly desirable thermoplastic polymers of α-olefins are those having a melt index less than about 100.

Of the additives which can be used with the thermoplastic particles of this invention, glass fibers are the preferred reinforcing agent. Glass fibers generally are about  to about ¼ inch in length and are used in amounts of about 5 percent to about 30 percent by weight, preferably about 8 to about 30 percent by weight, based on the weight of the thermoplastic particles. Other additives such as pigments, dyes, stabilizing agents, mold release agents, blowing agents such as p,p'oxybis-(benzene sulfonyl hydrazide) and the like can be added to the thermoplastic particles prior to cold compaction thereof into pellets.

The thermoplastic particles and desired additives are admixed, at ambient temperatures in a dry blender such as a drum tumbler and the like. After the admixing operation, the mix is formed into pellets by a cold-compaction operation. In this operation, the mix is fed to a rotary compactor via a feed-metering screw which feeds the mix into the roll bite of the rotary compactor. A rotary compactor and the one used to carry out the examples set forth in this application as shown in FIG. 1 was composed of two rollers having alternate toothed and flat surfaces on their face widths, the teeth of one roll working in the flat-bottom grooves of the opposed roll. Both rollers were driven (counter-rotating). The pellets came out of the rotary compactor in the form of a loosely connected string of prismatic, cold-compacted pellets. The strings were broken into separate pellets by the diverting action of the scraper blades in removing the pellets from the roll grooves.

The following examples further illustrate the present invention.

Example 1

Polyethylene, having a melt index of 4, a Standard Geometric Deviation of 2 and made up of a mixture of particles having the following particle size distribution:

1—All particles passed through 10 mesh,
2—91 percent (cumulative weight) passed through 18 mesh,
3—50 percent (cumulative weight) passed through 45 mesh,
4—15 percent (cumulative weight) passed through 80 mesh, was blended, at ambient temperatures, with 10 percent by weight, based on the weight of the thermoplastic particles, of ⅛ inch long glass fibers. The mix was fed into the roll bite of the compactor by means of a feed screw operating at 75 r.p.m. The rotary compactor was operated under the following conditions:

Roll speed=25 r.p.m.
Roll torque=6,900 lb. inch
Roll load=19,000 lbs.
Roll separation=0.01 inch The prismatic pellets produced had the following dimensions: 0.16 inch by 0.30 inch by 0.30 inch.

The compression strength of the pellets was determined by placing a pellet in a hydraulic press with the prismatic face of the pellet bearing directly against the parallel anvil surfaces of the press. Pressure was applied until the pellet fractured.

The compression pressure withstood by pellets before facture of this example (average of 10 pellets tested) was 1962 p.s.i.

Example 2

Polyethylene, having a melt index of 15 and a Standard Geometric Deviation and particle size distribution as defined for the polyethylene of Example 1 was admixed with 10 percent by weight, based on the weight of the thermoplastic particles, of ⅛ inch long glass fibers and formed into pellets in a manner described in Example 1.

The compression pressure withstood by pellets of this example (average of 10 pellets tested) was 1160 p.s.i.

Example 3

Pellets of Example 2 were injection molded into plaques ⅛ inch thick, 2½ inches wide and 6 inches long using a three-ounce Van Dorn reciprocating screw injection molding machine, under the following conditions:

Stock temperature=435° F.
Pressure=12,000 p.s.i.

The plaques were then subjected to various tests which are noted below, along with the result of those tests.

Flexural strength:
    ASTM D-790-66=4,800 p.s.i.
Flexural modulus:
    ASTM D-790-66=210,000 p.s.i.
Izod impact:
    ASTM D-790-56=1.0 ft.-lbs./inch$^3$
Heat Deflection temp.=72° C.

In order to further establish the criticality of the particle size distribution, Example 1 was repeated using as the thermoplastic particles, polyethylene with a melt index of about 3 and a Standard Geometric Deviation of 1.5 and a particle size distribution of:

80 percent (cumulative weight) passed through 10 mesh.
50 percent (cumulative weight) passed through 13 mesh.
17 percent (cumulative weight) passed through 18 mesh.
15 percent (cumulative weight) passed through 19 mesh.
4.3 percent (cumulative weight) passed through 30 mesh.

Compressive strength of pellets produced was negligible.

All mesh sizes noted herein were determined using U.S. Standard Screens.

What is claimed is:

1. Cold compacted pellets formed from thermoplastic particles having a maximum Standard Geometric Deviation of about 2.5 and a particle size distribution of:
    1—Substantially all particles smaller than about 10 mesh
    2—At least about 30 percent, on a cumulative weight basis of particles smaller than about 30 mesh.

2. Cold compacted prismatic pellets formed from thermoplastic particles defined in claim 1.

3. Cold compacted pellets as defined in claim 1 wherein the thermoplastic is a polymer of an α-olefin.

4. Cold compacted pellets as defined in claim 3 wherein the said polymer has a melt index of less than about 100.

5. Cold compacted pellets as defined in claim 3 wherein the α-olefin is polyethylene.

6. Cold compacted pellets, formed from a mixture containing thermoplastic particles defined in claim 1 and glass fibers.

7. Cold compacted pellets as defined in claim 6 wherein the glass fibers are present in an amount of about 5 to about 30 percent by weight.

8. Cold compacted pellets as defined in claim 6 wherein the glass fibers are present in an amount of about 8 to about 30 percent by weight.

9. Cold compacted pellets as defined in claim 1 wherein the mixture contains a blowing agent.

10. Thermoplastic particles, suitable for being compacted into pellets, having a maximum Standard Geometric Deviation of about 2.5 and a particle size distribution of:
    1—Substantially all particles smaller than about 10 mesh
    2—At least about 30 percent, on a cumulative weight basis of particles smaller than about 30 mesh.

11. A process for making shaped articles which comprises cold compacting into a shaped article thermoplastic particles having a maximum Standard Geometric Deviation of about 2.5 and a particle size distribution of:
    1—Substantially all particles smaller than about 10 mesh
    2—At least about 30 percent, on a cumulative weight basis of particles smaller than about 30 mesh.

12. A process for making shaped articles which comprises admixing at ambient temperatures glass fibers and thermoplastic particles defined in claim 11 and cold compacting the mixture into a shaped article.

13. A process as defined in claim 12 wherein the glass fibers are present in an amount of about 5 to about 30 percent by weight.

(References on following page)

References Cited

UNITED STATES PATENTS

| | | | |
|---|---|---|---|
| 3,708,387 | 1/1973 | Turner et al. | 161—168 |
| 2,579,036 | 12/1951 | Edelman | 161—169 |
| 2,729,855 | 1/1956 | Titus et al. | 264—109 |
| 3,188,264 | 6/1965 | Holden | 161—168 |
| 3,251,728 | 5/1966 | Humbert et al. | 161—168 |
| 3,255,285 | 6/1966 | Chilson | 264—109 |
| 3,414,643 | 12/1968 | Collie | 264—109 |

OTHER REFERENCES

Chemical Engineering: "Particle Size Analysis and Analyzers," C. E. Lapple, May 20, 1968.

MARION E. McCAMISH, Primary Examiner

U.S. Cl. X.R.

23—313; 161—168; 252—1; 264—29